United States Patent
Lavoie

(10) Patent No.: US 9,434,415 B2
(45) Date of Patent: Sep. 6, 2016

(54) TIRE WINDUP COMPENSATION

(71) Applicant: FORD GLOBAL TECHNOLOGIES, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 14/074,779

(22) Filed: Nov. 8, 2013

(65) Prior Publication Data

US 2015/0134201 A1 May 14, 2015

(51) Int. Cl.
*B62D 5/04* (2006.01)
*B62D 15/02* (2006.01)
*B62D 9/00* (2006.01)

(52) U.S. Cl.
CPC .............. *B62D 15/027* (2013.01); *B62D 9/00* (2013.01)

(58) Field of Classification Search
CPC ............................... B62D 15/027; B62D 9/00
See application file for complete search history.

(56) References Cited

U.S. PATENT DOCUMENTS

| 4,934,473 | A | * | 6/1990 | Fushimi et al. ............ 180/446 |
| 5,164,645 | A | | 11/1992 | Furuse et al. |
| 5,207,451 | A | | 5/1993 | Furuse et al. |
| 5,270,932 | A | | 12/1993 | Yoshizawa et al. |
| 6,672,421 | B2 | | 1/2004 | Larsson et al. |
| 6,723,934 | B2 | | 4/2004 | Enright |
| 8,406,958 | B2 | | 3/2013 | Kim |
| 2003/0150661 | A1 | * | 8/2003 | Kataoka et al. ............. 180/204 |
| 2008/0158011 | A1 | * | 7/2008 | Yamanaka ................. 340/932.2 |
| 2009/0303027 | A1 | * | 12/2009 | Nagamine et al. ........... 340/435 |
| 2010/0106372 | A1 | * | 4/2010 | Watanabe et al. ............. 701/41 |
| 2011/0276225 | A1 | | 11/2011 | Nefcy et al. |
| 2012/0139716 | A1 | * | 6/2012 | Nagamine et al. ........... 340/438 |
| 2013/0144492 | A1 | * | 6/2013 | Takano et al. .................. 701/42 |

FOREIGN PATENT DOCUMENTS

| DE | 10151010 A1 | | 4/2003 |
| DE | 10316350 A1 | | 10/2004 |
| KR | 20040024137 | * | 3/2004 |
| KR | 20040024137 A | | 3/2004 |

* cited by examiner

*Primary Examiner* — Mussa A Shaawat
(74) *Attorney, Agent, or Firm* — Raymond L. Coppiellie; Brooks Kushman P.C.

(57) ABSTRACT

A system for measuring and compensating for tire windup occurring in road wheels during parking events. A controller receives data comprising a steering motor current and steering system component movement, from that data determines the amount of tire windup is present, and controls the motor to turn a road wheel to an initial position that allows the tire windup to turn the road wheel to a final position. The final desired position of the road wheel may be one for the desired location of the road wheel itself, for the steering wheel, or for a combination of the two. Final desired angular positions of the steering wheel may be one such that an ignition may have greater visibility or one such that the steering wheel is not locked under load.

20 Claims, 2 Drawing Sheets

TIRE WINDUP COMPENSATION

TECHNICAL FIELD

This disclosure relates to vehicle steering systems with power assistance, and more specifically to the mitigation of the effects of tire windup on a steering system.

BACKGROUND

A tire is installed on a vehicle wheel to provide traction between the vehicle and the road as well as a flexible cushion to absorb shock. Most tires are pneumatic inflatable structures, comprising a doughnut-shaped body of cords and wires encased in rubber and generally filled with compressed air to form an inflatable cushion.

Due to a tire's construction, a tire may act as a spring and store potential energy when the wheel is turned. This spring-like effect is caused by the friction of the road surface which resists turning of the portion of the tire adjacent a contact patch of the tire with the road. As the wheel is turned, portions of the tire near the wheel turn with the wheel while portions of the tire near the contact patch with the ground may resist the turning motion. As a result, a portion of the tire between the wheel and the contact patch may elastically deform. The elastic deformation of the tire, or more specifically the desire of the tire to return to a non-deformed shape, provides the potential energy referred to as tire windup.

Tire windup may be more pronounced when a vehicle is not moving, or moving slowly, such as when the vehicle is parking. As a result, when the vehicle comes to a rest and the steering wheel is released, the windup of the tire may cause the steering wheel angle to snap to a different angle than the final location. In the case of an autopark event, where an electronic power assist motor turns the steerable wheels, when the autopark event is complete and power is removed from the motor, the tire windup may snap the steerable wheels and/or steering wheel to a different angle then the final desired location, or may leave the steering system locked in a position under load.

The tire wind-up may vary because of the friction between the tire and the road varies, so providing a constant overshoot to allow for tire windup may not allow the steering wheel to rest into a final desired position or remove load from the locked in place system for every scenario.

An Active Park Assist system is capable of performing an autopark event, and may command a final road wheel or steering wheel angle when the system completes a parking event. The system may command a zero angle, but after the vehicle is turned off, the system may relax and the tire windup may move the road wheel or steering wheel away from the zero angle. If the steering wheel is locked in the zero position, then the lock mechanism may be placed under load. A loaded steering wheel lock may cause issues when attempting to restart a vehicle, or may become more difficult to unlock. As well, it may be desirable to leave the steering wheel in a specific angular position other than the zero angle, and any movement from the specific final angular position would not be viewed as desirable.

SUMMARY

One aspect of this disclosure is directed to a system for compensating for tire windup on a road wheel as a result of a parking event. In this aspect of the disclosure, a controller is programmed to monitor the motor current of a motor when providing power steering during the parking event. The controller is then capable of relating the motor current to effort needed to turn the tires on the ground. The effort needed to turn a tire on the ground relates to the friction between the tire contact patch and the ground. The less motor current, the easier the effort, and the lower the friction. The more motor current, the higher the effort, and the higher the friction.

A sensor is also used to provide data to the controller relative to a steering component movement. The steering component may be a steering wheel, a steering gearbox component, or the wheels and tires that are being turned. The combination of the distance traveled by the component and the motor current necessary to travel that distance provides an estimate of the amount of tire windup that has occurred during the traveling of that distance. Taking into account the physical parameters of the tire, a windup of the tire may be determined, and as such, a tire spring-back caused by the windup may be determined. The controller would then be programmed to modify an output of the motor in response to the steering component movement data and motor current to reduce the effect of tire windup resulting from the parking event.

One embodiment of which would be that if the motor current was high, then tire windup would be likely to cause a spring-back in the system such that the desired stopping position of the wheel and tire (i.e. a predetermined desired road wheel angle position) would be undesirable. In this scenario, the controller may power the motor to turn the wheel and tire further past the desired stopping position, such that when power is removed from the motor, the system is allowed to relax and the wheel and tire would spring-back into the desired stopping position.

In another embodiment, during the parking event the final turn of the wheel and tire may require low to no motor current to accomplish. In this scenario the tires may be wound up in the other direction and the controller may be programmed to cut the motor sooner to allow the relaxation of the wheel and tire to pull the system forward into the desired stopping position.

In other embodiments the same concepts may be applied to the desired final stopping position of other steering components such as a steering wheel (i.e. a desired steering wheel angle position). In steering systems where the wheel and tire are hard linked to the steering wheel such that they move in relation with one another, spring-back caused by windup will also move the steering wheel. The movement of the steering wheel caused by tire windup may be to a new position that is not as desirable. The movement of the steering wheel caused by tire windup could also place a load on the locking system of the steering wheel. In these embodiments the motor may be controlled to turn the wheel and tire past the final position or cut the motor sooner to allow the system to relax and move into the final desired positions from the windup.

Another aspect of this disclosure is directed to a system for compensating for tire windup resulting from an automatic parking event. In this aspect, a controller is capable of receiving a steering wheel angle position and is programmed to determine an amount of tire windup based on a power steering motor current and the data from the steering wheel angle position. The controller is then programmed to control a power steering motor to position a steering wheel at an overshoot/undershoot angular position to allow the steering wheel to rotate to a desired end-of-parking angular position as the tire windup is relieved.

The controller may correspond the motor current to a friction between the tire contact patch and the road or surface the tire is on, and determine the amount of tire windup based off of the motor current and a tire windup factor.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
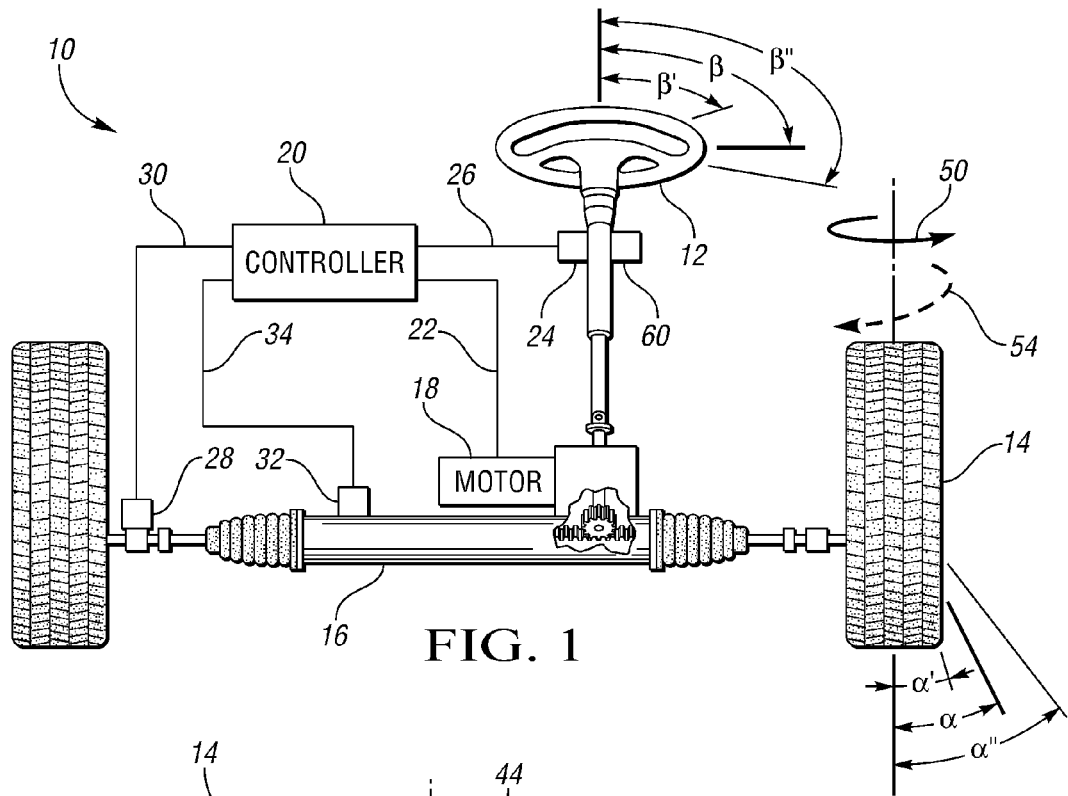
FIG. 1 is a diagrammatic view of a vehicular steering system.

FIG. 1 shows a steering system 10 having a steering wheel 12 in rotatable connection with a steerable wheel and tire assembly 14, hereinafter referred to simply as a road wheel 14, through a steering gearbox 16. The steering gearbox 16 transfers the rotational input of the steering wheel 12 to the road wheel 14, and vice versa. The pivotal positions of the road wheel 14 are shown as road wheel angle positions a and the rotational positions of the steering wheel 12 are shown as steering wheel angle positions β.

The angular position in which the road wheel 14 is substantially straight forward is referred to as the zero position, or as such that a is approximately equal to zero degrees. Toe in/out may account for slight variations of angular pivot from true zero, but zero position is intended as the road wheel position that allows the vehicle to track in a substantially straight forward direction. The pivot angle α is then given in degrees away from the zero position, either in a positive, negative or absolute value, as the road wheel 14 pivots away from the zero position in either direction. The position in which a steering wheel 12 is centered may also be referred to as a zero position, or clear view position. The zero position for the steering wheel 12 is when the steering angle β is approximately equal to zero degrees. The steering wheel 12 may rotate multiple revolutions past the zero position, such that a positive, negative, or absolute value of 360 degrees (or any whole number multiples of 360 degrees) brings the steering wheel 12 back into a clear view position each revolution, but the zero position of the steering wheel 12 is the steering wheel position that corresponds with the zero position of the road wheel 14.

The steering gearbox 16 may provide a mechanical advantage from the steering wheel 12 to the road wheel 14. The mechanical advantage of the steering gearbox 16 is such that the steering wheel 12 may go through multiple revolutions in a single direction while the road wheel pivots less than 180 degrees in a single direction from a maximum left turn pivot to a maximum right turn pivot, or vice versa. The steering gearbox 16 is diagrammatically shown here as a rack and pinion steering gearbox, although any other may be used. The steering gearbox 16 may also provide for a variable ratio steering such that the rate of pivot of the road wheel 14 is increased or decreased near the zero position (such as on large heavy duty vehicles) or at the ends of the left hand or right hand turning spectrums (such as on smaller automobiles and passenger cars).

A motor 18 may be connected to the steering system and used to assist the turning of the road wheels 14 or movement of the components within the steering gearbox 16. Motor 18 may be an electronic power assist motor used to provide power assistance to aid in the turning of the road wheel 14 when a driver turns the steering wheel 12, or may be a motor capable of executing an auto-steering event, in which the motor 18 turns the road wheels 14 while the vehicle performs an automatic computer controlled parking event with no input from the driver. The motor 18 is in communication with and activated by a controller 20, as shown by communication line 22. The motor is energized by the controller to turn the road wheel 14 and during use produces a motor current based on the amount of additional power is needed from the motor 18 to turn the road wheel 14. The easier it is to turn the road wheel 14 requires less current, and the harder it is to turn the road wheel 14 requires more current.

The system 10 may also be provided with a number of different sensors to provide data to the controller 20 on movement of various steering components within the system. A steering angle sensor 24 may be in communication with the controller 20 as indicated by communication line 26. The steering angle sensor 24 may be capable of providing data relative to a steering component movement such as the angular position β of the steering wheel 12. A road wheel angle sensor 28 may be in communication with the controller 20 as indicated by communication line 30. The road wheel angle sensor 28 may be capable of providing data relative to a steering component movement such as the angular position α of the road wheel 14. A rack movement sensor 32 may be in communication with the controller 20 as indicated by communication line 34. The rack movement sensor 32 may be capable of providing data relative to a steering component movement located within the steering gearbox 16. The rack movement sensor 32 may be any sensor that provides movement of any component within any steering gearbox 16.

Figure 2:
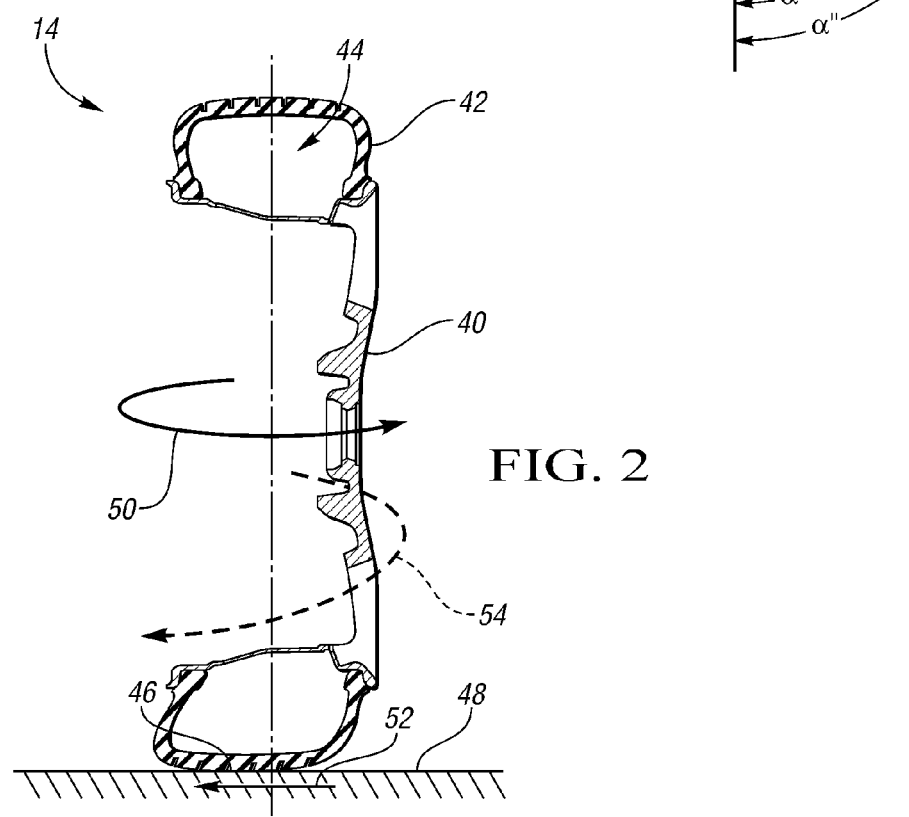
FIG. 2 is a cross-sectional view of a wheel and tire on a road surface.

FIG. 2 shows a cross-section of a road wheel 14 made up of a wheel 40 and tire 42. The wheel 40 is semi-ridged structure typically made of metal that does not experience noticeable elastic deformation during parking events. The tire 42, on the other hand, may be a rubbery pneumatic inflatable structure generally filled with compressed air 44 to form an inflatable cushion. Due to the tire's construction, a tire 42 may act as a spring and store potential energy when the wheel 40 is turned. The tire has a contact patch 46 where the tire 42 contacts the ground 48. As the wheel 40 is turned by the steering system 10, as indicated by solid arrow 50, the frictional forces 52 between the contact patch 46 and the ground 48 resist the turning motion 50. The spring-like construction of the tire 42 allows for elastic deformation to occur and the elastic deformation of the tire 42 provides a potential energy to try and return the road wheel 14 back in the opposite direction. The potential energy formed in a tire 42 due to elastic deformation of the tire 42 as a result of the frictional forces 52 of the contact patch 46 with the ground 48 is known as tire windup. The desire for the road wheel be to turned in the opposite direction by the tire windup is shown by dashed line 54.

A tire windup factor (not shown), is a variable that may be inputted into the controller 20 based on the characteristics of a tire 42 on the vehicle. The tire windup factor may be a tunable factor which may be input into the controller 20 by a manufacturer, dealer, or driver. The tire windup factor may be based on characteristics of the tire taken from a group consisting of material composition, ply construction, tread pattern, width, rim diameter, aspect ratio, rolling radius, recommended inflation pressure ranges, load rating, ground contact patch, and speed rating. For example, an off-road tire that has a spongy rubber composition, perhaps no steel belting, a very large knobby tread pattern, large aspect ratio and rolling radius with a low inflation pressure, high load rating, and large ground contact may have a larger tire windup factor than a racing slick with a hard rubbery composition, steel belting, thin tread pattern, low aspect ratio and rolling radius, a high inflation pressure, and a lower load rating may have a lower tire windup factor. The reason for this is that the off-road vehicle may produce more potential energy during the elastic deformation during the wheel turning than the racing slick.

Additional inputs may also be used in conjunction with the tire windup factor, such as utilizing a tire pressure sensor signals to know actual tire pressure, and vehicle loading sensors, such as height sensors in an air suspension, or accelerometers in active dampers, to know actual vehicle weight. Including real-time internal tire pressure and loading on the tire may allow for an increased accuracy in determining the amount of potential energy being stored by the tire.

Referring again to FIG. 1, as the vehicle is parked, the road wheel 14 may be turned, as shown by arrow 50, by the steering system 10 via motor 18. A predetermined desired road wheel angle position $\alpha$ may be desired, however, due to the tire windup (the tendency to turn back in the other direction as indicated by dashed arrow 54), the road wheel 14 may turn from $\alpha$ to $\alpha'$ when the steering system 10 relaxes. $\alpha'$ may not be a desired angular position of the road wheel 14 at the completion of the parking event. The desired angular position of the road wheel 14 may be in directions other than straight forward. One non-limiting example of which is when a vehicle ends a parking sequence facing upward on a hill next to a curb within a certain proximity of the right side of the vehicle. The predetermined desired road wheel angle position $\alpha$ may be an angular position of the road wheels turned nearly completely outward to the left such that the back of the right road wheel may be angled toward the curb. Many other scenarios exist in which it may be desirable to have the road wheels 14 pointed in a specific direction at the end of a parking event, while the vehicle remains parked, or even immediately before or during the vehicle being started.

To compensate for the tire windup, the steering system 10 may turn the road wheel to an overshoot angular position $\alpha''$, from this position the tire windup may move the road wheel 14 into the predetermined desired road wheel angle position a as the steering system 10 relaxes. However, due to variation in tire 42 characteristics and frictional differences between the contact patch 46 and the ground 48, a standard overshoot amount may not be consistently applied. As well, depending on the last amount of turning of the road wheel 14 during the parking event, the road wheel 14 may be in a pre-wound situation where an undershoot position $\alpha'$ would be better such that the motor 18 is cut-out early and the tire windup is then allowed to complete the turn into the desired road wheel angle position $\alpha$.

The controller 20 may be programmed to provide a variable compensation for tire windup on a road wheel 14. The controller 20 may be programmed to modify an output of the motor 18 in response to the steering component movement data, such as data from a steering angle sensor 24, road wheel angle sensor 28, or rack movement sensor 32, and a motor current generated by the motor 18 as it is used to turn the road wheels 14. The motor current provides information to the controller about the effort required to turn the road wheel 14 and provides an estimate of the friction between the road wheel 14 and the ground 48. A greater effort, resulting in a greater current, especially near the end of a turn event may signify a large amount of tire windup which needs to be relieved. As well, the stick-slip nature of the road wheel 14 may show a large build up of current, and then a sudden drop in current at the end of the turn event signifying that little tire windup exists requiring little to no relief. As well, if the desired angular position of the road wheel is such that the road wheel is turned back upon itself, a lower than normal current may run through the motor indicating a pre-wound tire and the controller may allow the road wheel 14 to turn the motor 18 without energy being applied to it.

The controller 20 may be programmed to utilize the motor 18 to achieve a predetermined desired road wheel angle position a by turning the road wheel to a different angular position than the desired road wheel angle position to a and allowing the tire windup to return it to $\alpha$, or by not influencing the motor 18 at all if no tire windup is present, or the amount present is negligible. The controller 20 utilizes the information available in the motor current, the angular distance of travel of the road wheel 14, and the current levels that exist over the angular distance of travel.

The controller 20 may energize the motor 18 to turn the road wheel 14 past the predetermined desired road wheel angle position $\alpha$ to an overshoot position $\alpha''$ to allow the road wheel 14 to spring-back into the predetermined desired road wheel angle position $\alpha$ as tire windup is relieved. The controller 20 may reduce energy the motor 18 before the road wheel 14 reaches the predetermined desired road wheel angle position $\alpha$ at an undershoot angle $\alpha'$ to allow the road wheel 14 to spring-forward into the predetermined desired road wheel angle position $\alpha$ as tire windup is relieved. The undershoot/overshoot positions $\alpha'$, $\alpha''$ being calculated for each individual end of parking turn based on the data of the motor current and movement of the system 10.

Similarly, the controller 20 may also be used to position the steering wheel 12 in a desired position. Since the steering wheel 12 is linked in movement with the road wheel 14, when the road wheel 14, and or the steering system 10, relaxes and moves due to tire windup, the steering wheel 12 may be moved out of a desired position as well. It may be advantageous to position a steering wheel 12 in an angular position $\beta$ such that an ignition 60 may be more easily located (a position that better aligns an opening of the steering wheel 12 with a drivers eyes and an ignition 60 to provide greater visibility of the ignition location). It may also be seen as advantageous to position the steering wheel 12 in a final position that does not place it under load if it is locked when the vehicle is turned off. Another predetermined desired steering wheel angle position would be one such that the instrument cluster, or a desired portion of the instrument panel, has greater visibility, or any number of other reasons for wanting a steering wheel to be placed in a specific rotational location.

To achieve a predetermined desired steering wheel angle position $\beta$ as tire windup is relieved, the controller 20 may be programmed to energize the motor 18 to turn the steering wheel 12 past the predetermined desired steering wheel angle position $\beta$ at an overshoot angle $\beta''$ to allow the road wheel 14 to spring-back causing the steering wheel 12 to then rotate into the predetermined desired steering wheel angle position β as tire windup is relieved. The controller 20 may also be programmed to reduce energy to the motor 18 before the steering wheel 12 reaches the predetermined desired steering wheel angle position β at an undershoot angle β' to allow the road wheel 14 to spring-forward causing the steering wheel 12 to rotate into the predetermined desired steering wheel angle position β as tire windup is relieved. The controller 20 may also recognize a neutral tire windup scenario in which it does nothing to change the course of the parking event. The controller 20 may control the motor 18 to provide a situation such that the steering wheel 12 is in a desired angular position β, which may allow for better visibility of an ignition 60 or provide the locking of the steering wheel 12 without significant torque being placed on a steering wheel locking mechanism (not shown).

The controller 20 is capable of receiving movement information of a steering component and control a power steering motor 18 to position a steering wheel 12 at an overshoot/undershoot angular position β', β" to allow the steering wheel 12 to rotate to a desired end-of-parking angular position β as the tire windup is relieved. The controller 20 may be programmed to correspond the motor current to a friction and determine the amount of tire windup based off of the motor current and a tire windup factor. The tire windup factor may be a tunable factor which may be input into the controller by a manufacturer, dealer, or driver. The tire windup factor may also be a tunable factor based on characteristics of the tire taken from a group consisting of material composition, ply construction, tread pattern, width, rim diameter, aspect ratio, rolling radius, recommended inflation pressure ranges, load rating, ground contact patch, and speed rating. The controller 20 may also be programmed to further enhance its accuracy and sensitivity by utilizing additional vehicle inputs in its calculations such as, but not limited to, braking input, wheel speed sensor data, vehicle speed, gear position, throttle position, steering wheel torque, and longitudinal acceleration. The controller 20 may also control the automatic parking event simultaneously to controlling the compensation for the tire windup.

The controller 20 may also control the motor 18 to provide a scenario in which the tire windup is relieved and a combination of a desired road wheel angular position and steering wheel angular position is simultaneously accomplished. An example of a combination of a desired road wheel angular position and steering wheel angular position may be when parallel parking upward on a hill such that the road wheel may be turned to the left to allow the back of a front right road wheel to be positioned against a curb. The controller 20 may recognize tire windup and control the motor 18 to relieve the tire windup while positioning the right road wheel in a reasonable position while also removing any load which may impact steering wheel locking, or even positioning the steering wheel in a location that improves ignition location when the driver comes back to the car to start it later.

Figure 3:
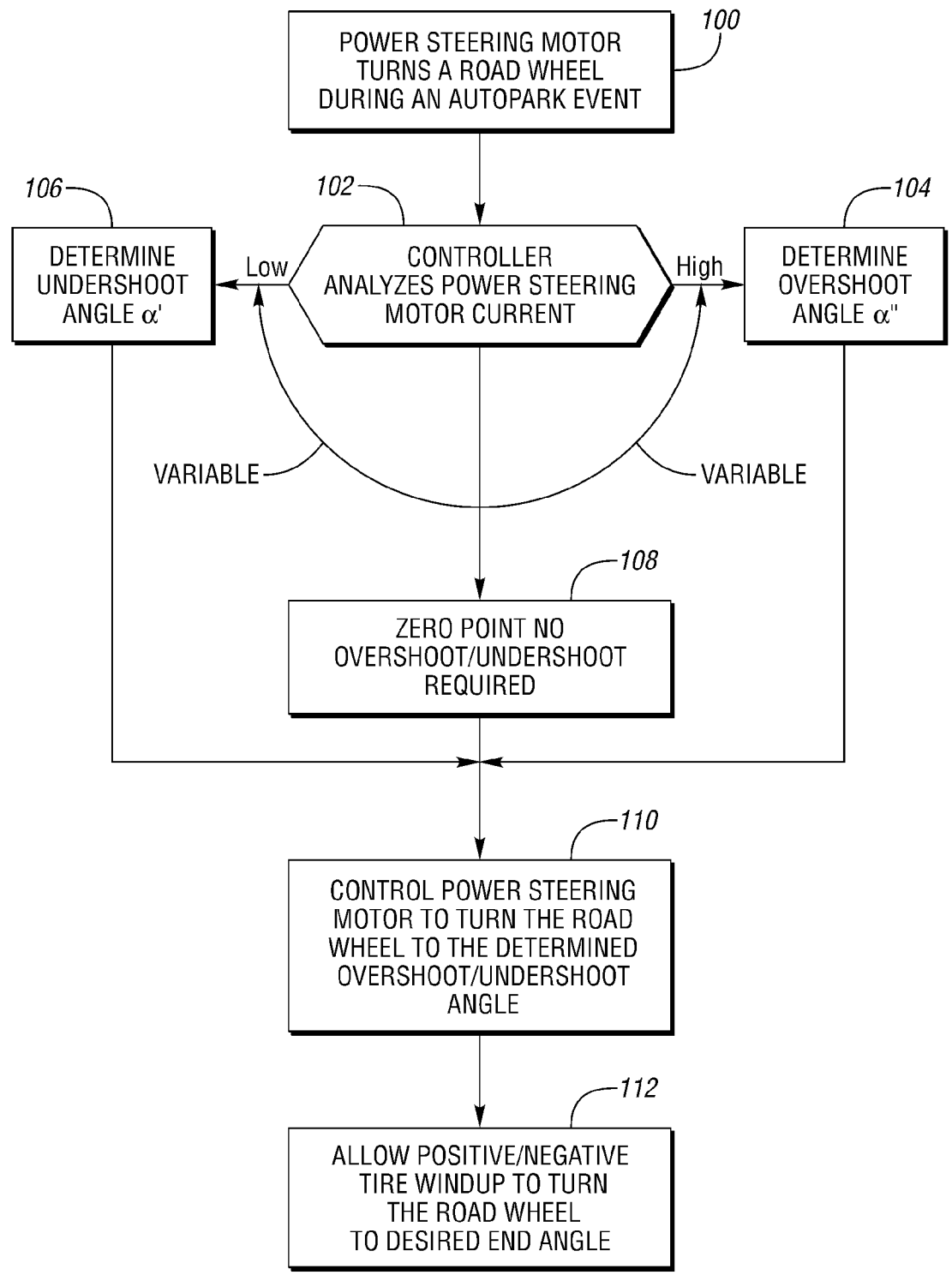
FIG. 3 is a flow chart of an example of a tire windup control strategy.

FIG. 3 is an exemplary flow chart of a tire windup control strategy. At step 100 a power steering motor turns a road wheel during an autopark event. At step 102 a controller analyzes the power steering motor current required to turn the wheels during the last wheel turn of the autopark event. If the motor current is higher than a preset value for the turn, then the strategy proceeds to step 104 and determines an overshoot angle α". If the motor current is lower than a preset value for the turn, then the strategy proceeds to step 106 and determines an undershoot angle α'. If the motor current is at, or near, the preset value for the turn, then the strategy proceeds to step 108 and no overshoot or undershoot angle is required. At step 110, the power steering motor is controlled to turn the road wheel to the determined overshoot/undershoot angle, if necessary. At step 112 the strategy allows for the system to relax and allow the positive or negative tire windup to turn the road wheel to a desired end angle. The desired end angle of the road wheel may be a direction that is not straight forward. The desired angle of the road wheel may correspond to a desired end angle of a steering wheel alone or in combination of the two. A desired end angle of a road wheel and steering wheel may be one in which the steering column is locked under no load. A desired end angle of a steering wheel may also be one in which an ignition may be more readily locatable.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A system for compensating for tire windup, comprising:
   a motor producing a motor current when providing power steering;
   a sensor capable of providing data relative to a steering component movement; and
   a controller programmed to modify an output of the motor after a parking event based on
      the steering component movement data, and
      a difference between the motor current during the parking event and a predetermined current magnitude, indicating tire windup from the parking event.

2. The system of claim 1 wherein the steering component is a steering wheel and the sensor measures steering wheel angular position.

3. The system of claim 1 wherein the controller is programmed to modify the output of the motor in response to the steering component movement data and motor current to achieve a predetermined desired road wheel angle position after tire windup is relieved.

4. The system of claim 3 wherein the controller energizes the motor to turn the road wheel past the predetermined desired road wheel angle position to allow the road wheel to spring-back into the predetermined desired road wheel angle position as tire windup is relieved.

5. The system of claim 3 wherein the controller reduces energy output by the motor before the road wheel reaches the predetermined desired road wheel angle position to allow the road wheel to spring-forward into the predetermined desired road wheel angle position as tire windup is relieved.

6. The system of claim 3 wherein the predetermined desired road wheel angle position is a direction other than straight forward on a vehicle.

7. The system of claim 1 further comprising a steering wheel, wherein the final steering wheel angular position may be effected by tire windup, and the controller is programmed to modify the output of the motor in response to the steering component movement data and motor current to achieve a predetermined desired steering wheel angle position as tire windup is relieved.

8. The system of claim 7 wherein the controller is programmed to energize the motor to turn the steering wheel past the predetermined desired steering wheel angle position to allow the road wheel to spring-back causing the steering wheel to rotate into the predetermined desired steering wheel angle position as tire windup is relieved.

9. The system of claim 7 wherein the controller is programmed to reduce energy to the motor before the steering wheel reaches the predetermined desired steering wheel angle position to allow the road wheel to spring-forward causing the steering wheel to rotate into the predetermined desired steering wheel angle position as tire windup is relieved.

10. The system of claim 7 wherein the predetermined desired steering wheel angle position is a position that allows the steering wheel to lock, and the tire windup is relieved such that the steering wheel locks without significant torque being placed on a steering wheel locking mechanism.

11. The system of claim 7 wherein the predetermined desired steering wheel angle position is a position that aligns an opening of the steering wheel with an ignition to provide greater visibility of the ignition.

12. A system for compensating tire windup resulting comprising:
a controller programmed to receive a steering wheel angle position, and control a power steering motor to position a steering wheel at an overshoot/undershoot angular position based on a comparison between a power steering motor current during a parking event and a preset value to allow the steering wheel to rotate to a desired end-of-parking angular position.

13. The system of claim 12 wherein the controller corresponds the motor current to a friction and determines an amount of tire windup based off of the motor current and a tire windup factor.

14. The system of claim 13 wherein the tire windup factor is a tunable factor which may be input into the controller by a manufacturer, dealer, or driver.

15. The system of claim 13 wherein the tire windup factor is a tunable factor based on characteristics of the tire taken from a group consisting of material composition, ply construction, tread pattern, width, rim diameter, aspect ratio, rolling radius, recommended inflation pressure ranges, load rating, ground contact patch, and speed rating.

16. The system of claim 12 wherein the controller controls the power steering motor to turn a road wheel and the steering wheel past the desired end-of-parking steering wheel angle position to allow the road wheel to spring-back causing the steering wheel to rotate into the desired end-of-parking steering wheel angle position.

17. The system of claim 12 wherein the compensation for tire windup allows the steering wheel to be locked at the desired end-of-parking angular position with substantially no torque on a steering wheel locking mechanism.

18. The system of claim 12 wherein the desired end-of-parking angular position of the steering wheel is an angular position which allows for improved ignition locatability.

19. The system of claim 12 wherein the controller is also programmed to control the power steering motor based on a tire windup determined from a group consisting of, braking input, wheel speed sensor data, vehicle speed, gear position, throttle position, steering wheel torque, and longitudinal acceleration.

20. The system of claim 1 wherein the controller is programmed to modify the output of the motor after the parking event
by a first amount based on the motor current during the parking event exceeding the predetermined current magnitude, and
by a second amount based on the motor current during the parking event being less than the predetermined current magnitude.

\* \* \* \* \*